(12) United States Patent
Rouse et al.

(10) Patent No.: US 6,743,836 B2
(45) Date of Patent: *Jun. 1, 2004

(54) METHOD FOR PREDISPERSING COMPOUNDING INGREDIENTS

(75) Inventors: Michael W. Rouse, Vicksburg, MS (US); Victor M. Deeb, Marlborough, MA (US)

(73) Assignee: R&D Technology, Inc., Vicksburg, MS (US)

( * ) Notice: Subject to any disclaimer, the term of this patent is extended or adjusted under 35 U.S.C. 154(b) by 562 days.

This patent is subject to a terminal disclaimer.

(21) Appl. No.: 09/768,497

(22) Filed: Jan. 25, 2001

(65) Prior Publication Data

US 2001/0052557 A1 Dec. 20, 2001

Related U.S. Application Data

(60) Provisional application No. 60/178,130, filed on Jan. 26, 2000.

(51) Int. Cl.$^7$ .................................................. C08J 3/00
(52) U.S. Cl. ....................... 523/338; 524/113; 524/210; 524/251
(58) Field of Search ........................ 523/338; 524/113, 524/210, 251

(56) References Cited

U.S. PATENT DOCUMENTS

| 4,148,763 | A |   | 4/1979  | Bryson |
|-----------|---|---|---------|--------|
| 4,426,459 | A |   | 1/1984  | Watabe et al. |
| 5,238,194 | A |   | 8/1993  | Rouse et al. |
| 5,303,661 | A |   | 4/1994  | Yu et al. |
| 5,411,215 | A |   | 5/1995  | Rouse |
| 5,604,277 | A |   | 2/1997  | Osborn |
| 5,719,215 | A |   | 2/1998  | Liang et al. |
| 5,758,961 | A |   | 6/1998  | Deal et al. |
| 6,013,720 | A |   | 1/2000  | Bell et al. |
| 6,333,373 | B1 | * | 12/2001 | Rouse et al. ................ 524/113 |

FOREIGN PATENT DOCUMENTS

| EP | 0490056 A1 | 6/1992 |
| GB | 828 162    | 2/1960 |
| WO | WO 92/01739 | 2/1992 |
| WO | WO 00/20461 | 4/2000 |
| WO | WO 00/39206 | 7/2000 |

OTHER PUBLICATIONS

Harry Ellwood, "A Tale of Continuous Development", European Rubber Journal, Mar. 1987, pp. 26, 29, and 32, vol. 169, No. 3, Publisher Paul Mitchell, Crain Communications Ltd.

* cited by examiner

*Primary Examiner*—Bernard Lipman
(74) *Attorney, Agent, or Firm*—Connolly, Bove Lodge & Hutz LLP

(57) ABSTRACT

The present invention relates to methods for predispersing additives used in a compounding process, as well as to predispersed particles. More particularly, the present invention relates to methods for predispersing, particularly ground elastomers which are used as compounding ingredients for many applications, especially for the production of rubber or plastic materials such as tires.

7 Claims, No Drawings

METHOD FOR PREDISPERSING COMPOUNDING INGREDIENTS

CROSS-REFERENCE TO RELATED APPLICATIONS

The instant specification claims priority to U.S. Provisional Patent Application No. 60/178,130, filed Jan. 26, 2000.

The following U.S. Patents are cross-referenced and incorporated by reference herein: U.S. Pat. No. 5,238,194 issued Aug. 24, 1993 to Rouse et al. for "METHOD OF PRODUCING FINE ELASTOMERIC PARTICLES"; U.S. Pat. No. 5,411,215 issued May 2, 1995 to Rouse for "TWO STAGE GRINDING".

BACKGROUND OF THE INVENTION

1. Field of the Invention

The present invention relates to methods for predispersing additives used in a compounding process. More particularly, the present invention relates to methods for predispersing additives, particularly ground elastomers which are used as compounding ingredients for many applications, especially for the production of rubber or plastic materials such as tires.

2. Description of the Related Art

In recycling and reusing rubber materials, it is generally known to decrease the size of such rubber materials to small ground rubber particles (i.e., particles of irregular outline that pass through a minus 80 mesh or through a minus 50-mesh or finer). Such particles can be chemically more reactive and mechanically easier to dissolve into various mixes.

A variety of rubber products (e.g., natural rubber, synthetic rubber, vulcanized rubber, automotive tire scrap, etc.) may be reduced to ground rubber particles. Known methods for producing rubber of a decreased size include cryogenic cracking of the rubber. Other known methods include the milling of the rubber between horizontal grinding stones in a horizontal grinding mill. Such milling techniques have been developed in the flour, paper pulp industry and the paint pigment compounding industries. Such milling techniques include grinding the rubber between opposed milling wheels, such that one wheel is fixed and the other wheel rotates relative to the fixed wheel. Such known milling techniques include pressing the two wheels against a rubber slurry, such that the rubber is ground to a fine state (i.e., powder). The final powder product can then used as an ingredient in compounding applications. For example, the fine powder can be used as an additive to compounding components for the formation of tire rubber, as an additive in the compounding of asphalt, and the like.

The use of powder additives such as ground rubber or other powder ingredients in compounding processes often times poses a handling problem. For example, the powder must be weighed and added in stoichiometric ratios to the compounding process. Due to the small particle size of the powder, the powder will readily disperse in air or under the slightest pressure such that measurement of exact and precise quantities is difficult, if not impossible. This phenomenon is true not just for ground elastomeric material, but for any powder or liquid compounding ingredient that is added in precise quantities.

For example, it is disclosed in U.S. Pat. No. 5,758,961 to Deal et al., the disclosure of which is incorporated herein by reference, that in mixing rubber, the dosaging of the different front base components must be very precise. This precise dosaging does not raise any particular problem when one proceeds by successive batches, that is to say, in batchwise processes. On the other hand, when it is a question of proposing continuous mixing, it is indispensable to be able to effect the necessary dosaging of the different ingredients continuously. Furthermore, in the case of powdered products, in addition to the difficulty of dosaging, there is the difficulty of transporting the products, particularly downstream of the dosaging.

Generally, dosaging units deposit the necessary ingredients at regular intervals on a belt conveyor which feeds the mixing unit or units proper. A recent attempt to make the mixing of rubber continuous is described in an article published in the "European Rubber Journal" for March, 1987, entitled: "A Tale of Continuous Development", incorporated herein by reference in its entirety. This continuous mixing process, already proposed in the prior art, effects the dosaging of components by weighing and then effects the introduction of different components into apparatus which effect a premixing, this being done at different places in the mixing chain. This, therefore, makes it necessary to install numerous separate apparatus, each carrying out a very precise function-weighing, conveying, premixing. It is only then that the different components can be introduced by gravity into feed wells, for instance in a mixer of the type described in patent application EP 0 490 056 which is very difficult, and creates the handling problems discussed above.

Accordingly, it would be desirable to have a process for adding compounding ingredients, especially for compounding of rubber or elastomeric virgin compositions, that makes addition of fine particles (or even liquids) more precise and reduces handling problems at least to some extent.

SUMMARY OF THE INVENTION

In accordance with the present invention there is provided a method for predispersing a first compounding ingredient of a downstream compounding process in a second liquid compounding ingredient of said downstream compounding process which is capable of solubilizing and/or dispersing the compounding ingredient therein and then using the now predispersed first and second ingredients in the downstream compounding process. In a particularly preferred embodiment, the first compounding ingredient is a powder, in particular ground rubber or a ground elastomer and the second compounding ingredient is an aromatic oil or ester. This method can optionally comprise converting an elastomer to a decreased size in a grinding apparatus using a size reduction operation and soaking the elastomer in the second compounding ingredient during the size reduction operation. The instant process can optionally include decreasing the size of an elastomer in a grinding apparatus to form a fine particle having a particle size of –50 mesh or –80 mesh, and then introducing the fine particle into a compounding process wherein the fine particle is mixed with an aromatic oil or ester at a predetermined stoichiometric ratio at a point upstream from (that is, at a point before) a mixer used in the compounding process.

In accordance with the present invention, there is also provided a predispersed particle. The particle includes an elastomer which has been predispersed in a solvent such as an aromatic oil or ester.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF THE PREFERRED EMBODIMENTS

The size of an elastomer (e.g., natural rubber, synthetic rubber, recycled rubbers containing polyethylene and/or polypropylene, vulcanized rubber, carbon black, waste from tire production, various polymers, various plastics, thermoplastic elastomers, thermoplastic vulcanates, polyethylene plastics, etc.) may be decreased using a variety of mechanisms. According to an exemplary embodiment, the elastomer is predispersed in a fluid that is capable of dispersing and/or solubilizing the elastomer and is a fluid that will be mixed with the elastomer in a downstream process. In particular, pre-swelling of vulcanized rubber with an oil normally used as part of a tire rubber (or other rubber) composition, enhances the dispensability/solubility of the vulcanized ground scrap into the host compound. Oils or esters of specific compositions can be used as plasticizers (softeners) for rubber and the oil/ester has to be an excellent solvent for the vulcanized rubber, otherwise the oil/ester would ooze out of the vulcanized composition. One of skill in the art would be capable of selecting appropriate oils or esters for a particular elastomer or ground particle. The swelling of the scrap rubber by the oil and/or ester can be enhanced by many different means, such as by heating, adding a surfactant to the oil and/or ester to enhance its ability to swell the vulcanized rubber quickly, by further reducing the particle size of the elastomer to expose more surface area and enhance the swelling process, and/or by grinding the rubber in the presence of an oil and/or ester emulsion which is sufficiently unstable to allow the transfer of the oil or ester from the water phase to the rubber.

There are several advantages to pre-swelling particulate materials that are used in later downstream processing. For example, in the case of ground rubber, by pre-swelling the ground vulcanized rubber with an appropriate plasticizer, oil or ester a degree of flow is imparted to the ground vulcanized rubber and enhances its acceptability by the host compound used in a downstream rubber compounding process. Pre-swelling also may reduce the dependency normally associated with the order components are added during rubber compounding processes, thus promoting better dispersion and physical properties.

Any ground elastomer that is used as an additive or component in a later, downstream process is within the scope of the present invention. For example, ethylene-propylene-diene rubber, natural rubber, isoprene rubber, butadiene rubber, styrene-butadiene rubber, chloroprene rubber, butyl rubber, ethylene-propylene rubber and acrylonitrile rubber are often suitable and lend themselves to comprise the ground particle of the present invention.

Most rubber compounds (indeed, most elastomeric compounds) contain one or more plasticizers, oils, esters or solvents. Therefore, it is necessary to add the plasticizer, oil ester or other solvent during the compounding process of the elastomer, rubber or plastic resin being produced. It is possible to preswell or predisperse the plasticizer, oil, ester or solvent in the elastomer or other particular or liquid material at any suitable ratio and one of skill in the art would be capable of selecting appropriate ratios. Advantageous ratios of elastomer to solvent include from 70:30 to 30:70 based on weight. The ratio the components are mixed in the preswelling/predispersing step is generally governed by at least two factors: first, the desired ratio of the two components in the final product that will be required for a downstream processing operation (such as when tire rubber is being prepared) and second, by the solubility parameter of the two components, (i.e. how much oil, plasticizer, ester or solvent can be uptaken based on the saturation point of the particular material). In some embodiments, 5–10 parts per hundred by weight of aromatic oil can be dispersed in elastomeric compounds such as styrene butadiene rubber (SBR), natural rubber (NR), butadiene (BD), or blends of, 100–200 parts per hundred by weight of suitable oil(s) can be dispersed in ethylene propylene terpolymer rubber (EPDM) compositions. Alternatively, an ester type plasticizer can be dispersed in nitrile butadiene rubber (NBR) or polyvinyl chloride (PVC). It is desirable if an oil is selected that does not readily bloom out of the compound upon vulcanization, unless a point of saturation is reached.

Suitable solvents (softeners, plasticizers, aromatic oils) according to the present invention include polyisobutylene, a liquid isoprene rubber, a liquid butadiene rubber, paraffin oil, aromatic oil, naphthenic oil and other vegetable or mineral oils. The amount of the softener or plasticizer is preferably at most 70 parts by weight, more preferably from 5 to 25 parts by weight, per 100 parts by weight of the total rubber content of the final product being made in the downstream operation such as in a tire rubber composition. Suitable esters include di(2-ethylhexyl) adipate (also known as dioctyl adipate or DOA), DOS, DOD or plasticizers in PVC.

According to a preferred embodiment, the fluid is an aromatic oil or an ester, which may optionally contain a surfactant. Soaking the elastomer, among other things, causes the elastomer to swell, removes oils from the elastomer and dissolves adhesives in the elastomer. According to an exemplary embodiment; a variety of water-soluble additives may be added to the soaking fluid. The additive, when used during soaking of the elastomer, decreases the swelling time of the elastomer as compared to elastomers soaked in the absence of the additive. According to an alternative embodiment, the additive may be a chemical that swells the rubber, but is not a tackifier, such as tetrahydrofuran (THF) or dimethyl formamide (DMF). According to other alternative embodiments, a variety of additives (as described below) may be used when soaking the elastomer. According to a preferred embodiment the additive used when soaking the elastomer is a fatty amine, such as DELAMIN" commercially available from Hercules, Inc.

Other compounding agents include those commonly used in a rubber industry can also be added into the predispersed mixture, or can be predispersed in a solvent such as an aromatic oil, plasticizer, ester or the like. For example, vulcanizing agents such as sulfur and peroxides; vulcanization accelerators such as thiazole, thiuram, sulfenamide and guanidine types; vulcanization aides such as stearic acid and zinc white; activators such as diethylene glycol and polyethylene glycol; reinforcing agents, such as various grades of carbon black such as FEF, HAF, ISAF and SAF, and calcium carbonate; fillers such as thermal black, acetylene black, graphite, clay and talc; and plasticizers, antioxidants and process oils. Additional compounding agents may be suitably selected from among these various compounding agents according to the purposes and applications of the resulting rubber compositions. The components to be predispersed together can be kneaded together by means of a mixer such as a roll or Banbury.

Pre-swelling and/or predispersing of vulcanized rubber (or other particulate material) with a suitable plasticizer/oil can be done in one of several ways. For example, a ground vulcanized rubber can be mixed with a suitable plasticizer, oil, ester or solvent in a high-speed mixer such as a Henshel or any high-speed mixer known to those familiar with the art. This predispersing can be done at the time the rubber particle is ground into its desired size of less than −50 mesh or less than −80 mesh. That is, the plasticizer/aromatic oil can be added during formation of the ground fine particle, i.e., during a grinding operation as disclosed, for example, in U.S. Pat. Nos. 5,411,215 and/or 5,238,194, the disclosures of which are incorporated herein by reference in their entireties. Alternatively, the vulcanized rubber can be ground in the presence of solubilized or dispersed plasticizer/oil in water, wherein the solublizing or dispersing of plasticizer/oil is by the use of an appropriate additive which can be used in addition to the oil/plasticizer or in lieu thereof. The grinding process forces the transfer of the plasticizer/oil from the water to the vulcanized rubber. In this case, it would be advantageous to ensure complete transfer of the oil from the water to the rubber, so no residual oil is left in the water. Suitable additives are disclosed, for example, in U.S. patent application Ser. No. 09/247,569 filed Feb. 10, 1999, which is incorporated herein by reference in its entirety. Such suitable additives include a water miscible dispersing agent for carbon black, such as DAXAD™ commercially available from R.T. Vanderbilt Company, Incorporated of Norwalk, Conn. According to a particularly preferred embodiment about 25% DAXAD™ is added to an elastomer slurry of 15% to 60% solids. According to an alternative embodiment, the additive is a surfactant, such as TRITON-X™ commercially available from Robin & Haas Company. According to a particularly preferred embodiment, the additive is added to the slurry in the amount of about 1% to 20% based on the amount of elastomer in the slurry, and about 10% to 15% by total weight of the elastomer in the slurry.

The additive provides a higher yield at the first pass of grinding of the slurry as compared to a slurry in which the additive is absent. Use of the additive produces a higher quantity (i.e., more uniformly fine ground and having less shear) particle as compared to the particles produced from a slurry in which the additive is absent. A slurry having an additive yields a significant increase in throughput of ground particles of the desired smaller size, and a smaller percentage of particles passed through the mill without adequate reduction in size. This alone is beneficial, as the economic losses occasioned by the necessity of screening out insufficiently reduced particles and re-grinding them can be reduced. Further, use of the additive provides decreased grinding times of the slurry as compared to a slurry in which the additive is absent. Decreased grinding times may reduce wear and damage to the wheels of the grinding apparatus. The additives provide a lower temperature to the slurry as compared to a slurry in which the additive is absent. A slurry in which the additive is absent reaches a temperature of about 400° to 450° Fahrenheit, whereas the slurry having the additive reaches a temperature of about 300° Fahrenheit. Decreased temperature of the slurry is beneficial, in part, because high temperatures may destroy some polymers, less insulation is required in the grinding apparatus, heat damage to the grinding apparatus is decreased and the temperature of the grinding operation is better controlled to achieve the desired viscoelastic effects in milling the elastomer.

The additives chemically react with the elastomer to produce a more desirable elastomer particle. The glass transition temperature (Tg) of the elastomer-additive product is reduced as compared to elastomer particle product in which the additive is absent. A lower Tg value is beneficial in producing downstream materials from the elastomer-additive product because a lower temperature is required for the elastomer additive product to change from a brittle state to a plastic state, which reduces energy costs. Further, the additives chemically react with the elastomer to produce a more tacky elastomer-additive particle product as compared to the elastomer particle product in which the additive is absent. The additive can be added in any desired amount. Preferably the additive is added in an amount from 0.5% to 95%, more preferably from 5% to 40% advantageously from 5% to 20% but in a preferred embodiment is added in an amount of about 10% or 10%, in each case being based on the total weight of the elastomer.

According to another alternative, the vulcanized rubber (or other particulate material or component) can be ground in the presence of a resin or a neutralized solution of a resin, such as rosin acid, dimer of rosin acid or polymerized rosin acid, either wood or tall oil rosin, since adding rosin acid to a toluene solution of a vulcanizable compound, gelled due to premature vulcanization, reduced the solution viscosity significantly. Suitable additional neutralizing agents are disclosed, for example, in U.S. patent application Ser. No. 09/247,569 which is incorporated by reference in its entirety.

According to one embodiment, the additive is a resin (natural or synthetic). According to other alternative embodiments, the additive is a rosin (i.e., a mixture of monocarboxylic acids having a hydrophenanthrene nucleus) such as gum rosin or wood rosin. Rosins are of particular interest because they tend to act as dispersing agents in the elastomer slurry and affect the tackiness of the elastomer-additive product. According to a preferred embodiment of the present invention, the rosin is tall oil rosin (i.e., a by-product of the paper manufacturing process). According to a particularly preferred embodiment, the tall oil rosin has a low acid number, such as XP56 commercially available from Arizona Chemical Company. According to an alternative embodiment, the additive is a resin acid (i.e., abietic-type acids that contain an isopropyl group pendent from carbon 13 as numbered using the Chemical Abstracts system, or pimaric-type acids that include a methyl and vinyl group pendent from the same carbon atom). According to other alternative embodiments, the resin acid is abietic acid or rosin soap (i.e., rosin leached with sodium hydroxide). The rosin is made water-soluble by neutralizing the rosin with a suitable base, such as ammonia, ammonium hydroxide, an amine (i.e., a Frisch amine). Other additives of interest include any rosin acid, polymerized rosin acid, esters of rosin acid, dispersions of rosin acid, dispersions of esters of rosin acid, copolymers of rosin acid, disproportionated rosin acid, hydrogenated rosin acid, 9-anthracene carboxylic acid, 2-ethylhexanoic acid, acetal R-type acids, or any organic acid that could be soluble in water by neutralizing the acid. According to an alternative embodiment, the additive is oleic acid (i.e.,(CH3(CH2)7CH CH(CHz)7COOH derived from animal tallow or vegetable oils). Oleic acid may not substantially modify the tackiness of the elastomer-additive product. According to an alternative embodiment, the additive is an oligimer (i.e., a low molecular weight polymer molecule consisting of only a few monomer units (e.g., dimer, trimer, tetramer)). According to a preferred embodiment, the oligimer has a viscosity of about 100,000 CP and tends to act as a dispersing agent in the elastomer slurry. The oligimer can include short chain copolymers of styrene and maleic anhydride that offer typical anhydride functionality in a polymeric material such as SMA™ resin commercially available from Sinclair Petrochemicals, Incorporated. According to a preferred embodiment, the oligimer is ethylene-maleic anhydride copolymers such as EMA™ resin commercially available from Monsanto Industrial Chemical Co.

A filler may optionally be added to the slurry. The filler may be added to the slurry (i.e., elastomer slurry or elastomer-additive slurry) to combine with the slurry to form an elastomer-additive product or an elastomer product having reinforcing properties, temperature modifying properties, increased high surface area, and/or increased tensile strength. A filler (e.g., nylon) combines with the final elastomer product to give the final product reinforcing properties, temperature modifying properties, increased high surface area, and/or increased tensile strength. According to a particularly preferred embodiment of the present invention, the filler is a nylon material.

A second way the present process can be conducted is as follows. Instead of being predispersed at the time of grinding, the ground particle (particulate material) can be formed without the incorporation of plasticizer or oil. The incorporation of the oil/plasticizer in the particulate or powder material is conducted at the site of downstream processing (i.e. at a chemical plant for compounding rubber for tires, shoe soles, or rubber or elastomers for any application). According to this embodiment, at an upstream side of the conventional mixer (a Banbury or like equipment), the ground particle (fine powder) is mixed with the solvent which is to be predispersed. This arrangement effectively eliminates the use of a conveyor belt or cyclone which is generally used to add fine powders or difficult to handle ingredients. Thus, the precise stoichiometric ratio of powder to solvent needed for the downstream process in the Banbury mixer can be adjusted at a point upstream from the main mixing chamber, thereby eliminating (or at least reducing) handling difficulties associated with fine powders or hard to handle ingredients. In this instance, a metered amount of oil and powder (ground vulcanized rubber) can be pumped through a static mixer, optionally heated to expedite the swelling of the vulcanized rubber (or other particulate material) by the oil, at a point upstream to the addition to the host compound in an internal mixer. According to this embodiment, it is highly preferred that the oil/plasticizer mixing chamber be positioned at a point upstream of the conventional Banbury type mixer that is typically used in compounding rubber.

Most rubber compounds (indeed, most elastomeric compounds) contain one or more plasticizers, oils, esters or solvents. Therefore, it is necessary to add the plasticizer, oil ester or other solvent during the compounding process of the elastomer, rubber or plastic resin being produced. It is possible to pre-swell or predisperse the plasticizer, oil, ester or solvent in the elastomer or other particular or liquid material at any suitable ratio and one of skill in the art would be capable of selecting appropriate ratios. In some embodiments the ratio of elastomer to solvent is from 90:10 to 10:90, more preferably 70:30 to 30:70 all based on weight.

EXAMPLES

Example 1

To a ground rubber scrap in a Henshel mixer, aromatic oil (optionally with a surfactant) was added under high-speed agitation to produce a free flowing powder at a ratio of 3 parts ground scrap rubber to 1 part aromatic oil, and the presence of a surfactant (at a 1 to 2% level). In this case, the surfactant acts as a partitioning agent.

Example 2

To an aromatic oil/surfactant mixture containing water (4 to 6% surfactant based on the weight of the oil), under high speed agitation, rubber to be ground was added. The rubber was ground to a −50 mesh according to the methods of U.S. Pat. Nos. 5,411,215 and/or 5,238,194. According to the process of example 2, the grinding process permitted the transfer of the oil from the water phase to the rubber phase while grinding, and allowed the surfactant to partition the swelled particles into a free flowing material which is easy to handle.

Example 3

Ground vulcanized rubber scrap having a particle size of about −80 mesh was mixed with aromatic oil and pumped through a static mixer with a surfactant, at room temperature. The oil/rubber mixture is then packaged and used as an ingredient in the compounding of a host EPDM compounds. The rubber scrap is added at an amount of from 5 to 10 parts per hundred parts of rubber (PHR).

Suitable amounts of each component are listed below in Table 1:

TABLE 1

| (Parts per hundred, by weight based on the weight of the host rubber to be prepared) | | |
|---|---|---|
| Scrap rubber | 15 | 30 |
| Aromatic oil | 5 | 10 |
| Surfactants | 0.2 | 0.6 |

By conducting a process according to the present invention, it is possible to incorporate, for example, 15 to 30 parts per hundred of ground scrap rubber, based on the total parts of rubber in the rubber formulation being prepared. According to the present invention, the softening points of the final rubber formulation (host rubber) are much lower, the penetration properties are much lower, their viscosities are generally lower at all temperatures, their mandrel bend at cold temperatures is much higher, their load strain properties (elongation, tensile strength, etc.) were quite good. In fact, the ground tire rubber and additive mixtures had properties more similar to ground natural rubber as opposed to the ground tire rubber control.

It is important to note that the use of the term "production of elastomer particles" is not meant as a term of limitation, insofar as any product which may incorporate the elastomer product is intended to be within the scope of the term. For example, the elastomeric product may be incorporated into or useful in the production of air blown asphalt, paving asphalt, roofing asphalt (e.g., shingles, roof roofing, undergarments, various membranes, etc.), paving cement (i.e., portland cement), the manufacture of any rubber article (e.g., tires, carpet backings, shoe soles, plastic garbage containers, etc.), thermoplastic elastomers, automotive goods (i.e., underbody coatings), insulation, etc.

Suitable materials within the scope of the present invention along with their acronym designations are listed below:

| | |
|---|---|
| ACM | polyacrylate |
| ACN | acrylonitrile |
| AU | urethane (ester) |
| BDO | 1,4-butanediol |
| BIIR | bromobutyl rubber |
| BR | polybutadiene rubber |
| CBS | N-cyclohexyl-2-benzothiazolesulphenamide |
| CIIR | chlorobutyl rubber |
| CO | epichlorohydrin homopolymer |

-continued

| | |
|---|---|
| CR | polychloroprene rubber |
| | chloroprene rubber |
| CSM | chlorosulfonated polyethylene, i.e., Hypalon |
| DCBS | N,N-dicyclohexyl-2-benzothiazyl sulfenamide |
| DOP | dioctyl phthalate |
| DPG | diphenyl guanidine |
| DTDM | dithiodimorpholine |
| EAM | ethylene vinyl acetate |
| ECO | epichlorohydrin copolymer |
| EPM | ethylene propylane copolymer rubber |
| EPDM | ethylene propylene terpolymer rubber |
| EU | urethane (ether) |
| EVM | ethylene vinyl acetate |
| FFKM | perfluoromethyl vinyl ether and tetrafluoroethylene copolymer |
| FKM | fluoroelastomer, i.e., Viton |
| GECO | epichlochydrin terpolymer |
| GR-S | Government rubber-styrene |
| HPPD | N-(1,3-dimethyl)-Nc̈-phenyl-pphenylenediamine |
| HQEE | hydroquinone bis (-b-hydroxyethyl) ether |
| HNBR | hydrogenated nitrile |
| HSN | hydrogenated nitrile |
| IIR | butyl rubber |
| | isobutylene isoprene rubber |
| IR | polyisoprene |
| MBS | 2-(morpholinothio) benzothiazolesulphenamide |
| MBT | mercaptobenzothiazole |
| MCBA | 4,4'-methylene bis (2-chloroaniline) |
| MDI | methylene diisocyanate |
| MEK | methyl ethyl ketone |
| NBR | nitrile butadiene rubber |
| NR | natural rubber |
| PCLG | polycaprolactone glycol |
| PEAG | polyethylene adipate glycol |
| PEG | polypropylene ether glycol |
| PTMEG | polytetramethylene ether glycol |
| PVC | polyvinyl chloride |
| Q | silicone elastomers |
| SBR | styrene butadiene rubber |
| SIBR | styrene-isoprene-butadiene rubber |
| SSBR | styrene butadiene rubber (solution) |
| TDI | toluene diisocyanate |
| TEA | triethanolamine |
| TFE/P | tetrafluoroethylene propylene copolymer |
| TIPA | tiisopropanolamine |
| TMP | trimethylol propane |
| TMTD | tetramethyl thiuram disulfide |
| TMTM | tetramethyl thiuram monosulfide |
| TPE | thermoplastic elastomer |
| ZDBC | zinc dibutyl dichiocarbamate |

It is important to note that the use of the term "production of elastomer particles" is not meant as a term of limitation, insofar as any product which may incorporate the elastomer product is intended to be within the scope of the term. For example, the elastomeric product may be incorporated into or useful in the production of air blown asphalt; paving asphalt, roofing asphalt (e.g., shingles, roof roofing, undergarments, various membranes, etc.), paving cement (i.e., portland cement), the manufacture of any rubber article (e.g., tires, carpet backings, shoe soles, plastic garbage containers, etc.), thermoplastic elastomers, automotive goods (i.e., underbody coatings), insulation, etc.

Although only a few exemplary embodiments of the present invention have been described in detail in this disclosure, those skilled in the art who review this disclosure will readily appreciate that many modifications are possible in the exemplary embodiments (such as variations in sizes, structures, shapes and proportions of the various elements, values of parameters, or use of materials) without materially departing from the novel teachings and advantages of the invention. Accordingly, all such modifications are intended to be included within the scope of the invention as defined in the appended claims. Other substitutions, modifications, changes and omissions may be made in the design, operating conditions and arrangement of the preferred embodiments without departing from the spirit of the invention as expressed in the appended claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method for predispersing compounding ingredients comprising:

dispersing and/or solubilizing a first compounding ingredient of a downstream compounding process in a second liquid compounding ingredient of said downstream compounding process which is capable of solubilizing and/or dispersing the compounding ingredient therein, converting an elastomer to a decreased size in a grinding apparatus using a size reduction operation and soaking the elastomer in the second compounding ingredient during the size reduction operation and using the now predispersed first and second ingredients in the downstream compounding process.

2. A method according to claim 1, wherein the first compounding ingredient is a powder.

3. A method according to claim 1, wherein the powder is ground rubber or an elastomer and the second compounding ingredient is an aromatic oil, ester, or plasticizer.

4. A method according to claim 1, further comprising: decreasing the size of an elastomer in a grinding apparatus to form a fine particle having a particle size of −50 mesh or −80 mesh, and introducing the fine particle into a compounding process wherein the fine particle is mixed with an aromatic oil, ester or plasticizer at a predetermined stoichometric ratio at a point upstream from a mixer used in the compounding process.

5. A predispersed particle comprising an elastomer which has been predispersed in a solvent at a predetermined ratio associated with a downstream processing method.

6. A particle as claimed in claim 5, wherein the solvent comprises one selected from the group consisting of a plasticizer, and aromatic oil and an ester.

7. A particle as claimed in claim 5, wherein the predetermined ratio of elastomer to solvent is from about 70:30 to 30:70.

* * * * *